United States Patent [19]

Morishima

[11] Patent Number: 4,686,656
[45] Date of Patent: Aug. 11, 1987

[54] SUPPLEMENTARY LIGHT DEVICE FOR MOTORCYCLES

[75] Inventor: Kazuo Morishima, Shiki, Japan

[73] Assignee: Honda Giken Kogyo K.K., Tokyo, Japan

[21] Appl. No.: 908,891

[22] Filed: Sep. 18, 1986

Related U.S. Application Data

[63] Continuation of Ser. No. 756,026, Jul. 17, 1985, abandoned.

[30] Foreign Application Priority Data

Jul. 19, 1984 [JP] Japan ............... 59-109153[U]

[51] Int. Cl.⁴ ............................................ F21V 33/00
[52] U.S. Cl. ............................. 362/72; 296/78.1; 280/289 S
[58] Field of Search ............ 296/78.1; 280/289 S; 362/72, 61, 80, 83, 43, 41, 37, 249, 296, 382, 364, 300

[56] References Cited

U.S. PATENT DOCUMENTS

| | | | |
|---|---|---|---|
| 4,121,278 | 10/1978 | Doll | 362/72 |
| 4,355,838 | 10/1982 | Hickman | 296/78.1 |
| 4,461,508 | 7/1984 | Ogishima | 280/289 S |
| 4,515,405 | 5/1985 | Ogishima | 280/289 S |

OTHER PUBLICATIONS

*Cycle World*, Jan. 1981, Honda's Turbo Teaser, pp. 78–79.
*Cycle World*, Jul. 1983, Honda Goldwing Aspencade, p. 38.

*Primary Examiner*—Charles J. Myhre
*Assistant Examiner*—D. M. Cox
*Attorney, Agent, or Firm*—Arthur L. Lessler

[57] ABSTRACT

A supplementary light device for use with a motorcycle including a fairing covering at least front and front lower areas of a main frame structure thereof and having a bifurcated and depending part extending downwardly on either side of the main frame structure. The supplementary light device is adapted to be incorporated integrally in the bifurcated and depending part of the fairing.

10 Claims, 12 Drawing Figures

SUPPLEMENTARY LIGHT DEVICE FOR MOTORCYCLES

This is a continuation of application Ser. No. 756,026, filed July 17, 1985, now abandoned.

BACKGROUND OF THE INVENTION

This invention relates to a supplementary lamp device for motorcycles, and more particularly to improvements in the structure of a mount for a supplementary light device of this kind.

It is known that motorcycles are generally equipped with light devices such as a main or head lamp, a tail lamp, and like lighting means, and that some motorcycles are also equipped with a supplementary light device on either side of the body of the motorcycle in addition to the head lamp, for illuminating sides or curbs of the street.

According to the conventional construction, however, it is the practice that such an additional lighting device as a supplementary light device is designed to be mounted on the motorcycle's frame structure by way of support members such as a pipe stay, which would generally increase the number of parts involved for the support of such supplementary light device, thus resulting in inconveniences in the installation of the lighting device, and thus consuming additional time and labors, and which would inevitably bring an increase more or less in the production cost.

SUMMARY OF THE INVENTION

It is a primary object of the invention to provide an improved support structure for a supplementary light device for use with a motorcycle, which can afford a substantial reduction in the number of parts as involved in the installation of this lighting device, thereby contributing to a substantial curtailment of the production cost.

It is another object of the invention to provide an improved supplementary light device for a motorcycle, which can facilitate the installation work thereof onto the main frame structure of the motorcycle, thus further reducing the production cost.

In order to achieve these objects, the present invention provides a supplementary light device for use with a motorcycle of the type including a main frame structure, and a fairing covering at least front and lower areas of the main frame structure and having a bifurcated and depending part extending downwardly on either side of the main frame structure. The supplementary light device is adapted to be incorporated integrally in the bifurcated and depending part of the fairing.

The above and other objects, features and advantages of the invention will become more apparent from the ensuing detailed description taken in conjunction with the accompanying drawings.

DETAILED DESCRIPTION

The present invention will now be described with reference to the accompanying drawings showing preferred embodiments thereof.

Figure 1:
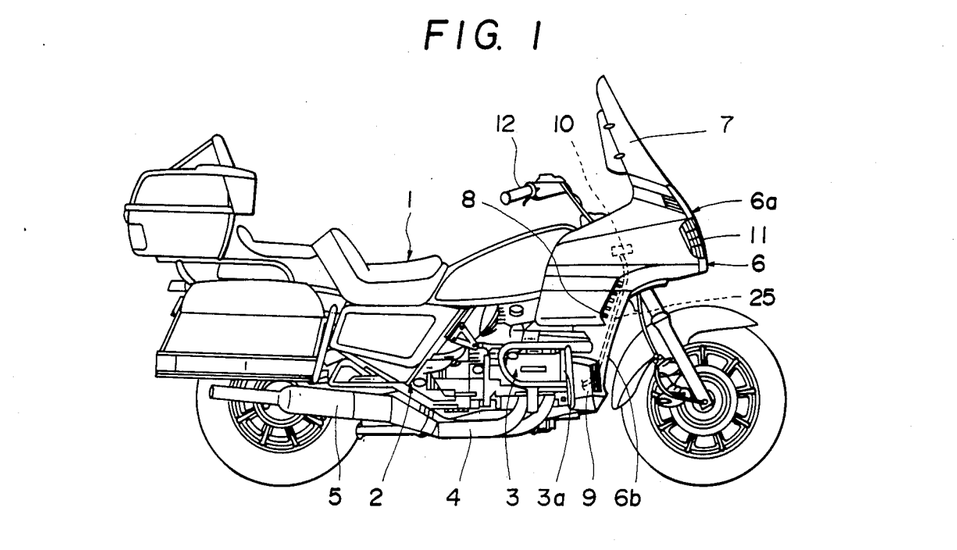
FIG. 1 is a side elevational view showing generally a motorcycle with an improved supplementary light device according to the present invention, installed on both sides of a fairing in the front area of the motorcycle.
Figure 2:
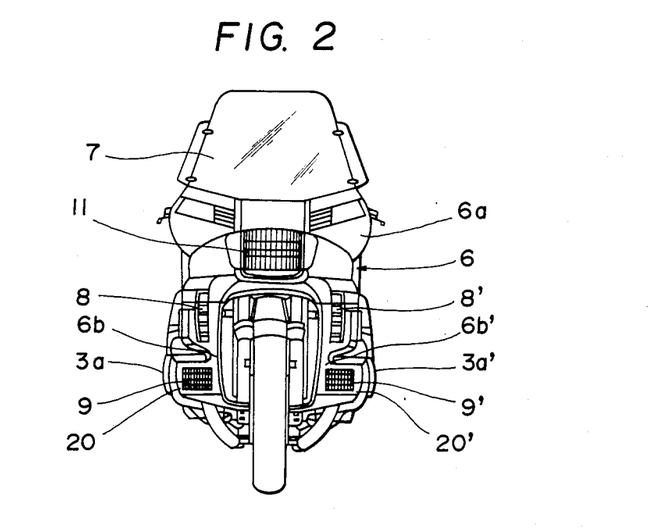
FIG. 2 is a front elevational view showing the general appearance of the motorcycle with the supplementary light device of the invention shown in FIG. 1 mounted in the lateral positions thereof.

Referring first to FIGS. 1 and 2, there is shown, by way of a first preferred embodiment of the invention, the general longitudinal appearance of an autobicycle or motorcycle construction designated generally at reference numeral 1, wherein there is seen a horizontally opposed cyclinder engine at 3 mounted generally in the center of a main frame structure 2 of the motorcycle 1, with cylinder heads 3a, 3a' of the engine 3 projecting outwardly on both lateral sides of the main frame 2, and with exhaust pipes 4 extending rearwardly under a lower portion of the main frame 2 in such a manner that the tailing end of the exhaust pipe extends further rearwardly by way of a muffler 5, eventually opening to the atmosphere.

Also, there is shown provided a fairing cover 6 around the main frame structure 2, which extends in a surrounding fashion from the head area of the main frame structure to either sides thereof, with an upper portion 6a of the fairing cover 6 (hereinafter referred to as "the upper fairing cover") extending surroundingly from the area of a headlight casing. A headlight 11 is incorporated in a front surface of the upper fairing cover 6a at a lower portion thereof. An air screen or wind shield panel 7 is affixed to an upper edge of the upper fairing cover 6a.

Figure 3:
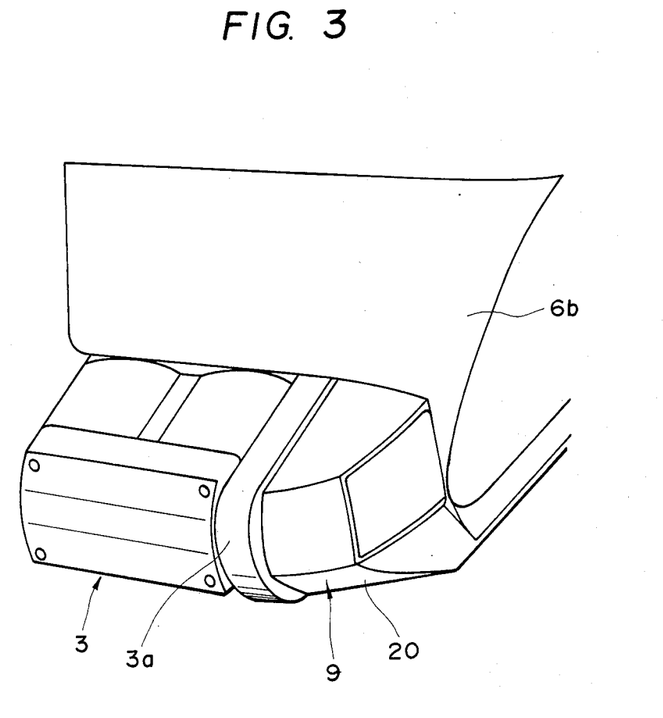
FIG. 3 is a perspective view, on an enlarged scale, of the supplementary light device and the engine of the motorcycle.
Figure 4:
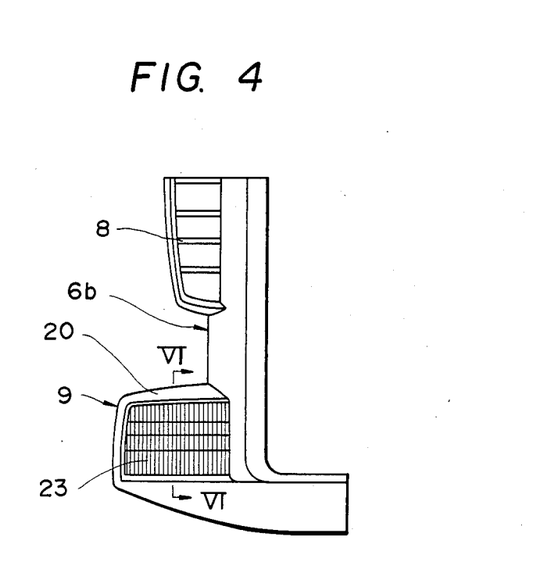
FIG. 4 is a fragmentary front elevational view showing an underfairing structure shown partly in FIG. 2.
Figure 5:
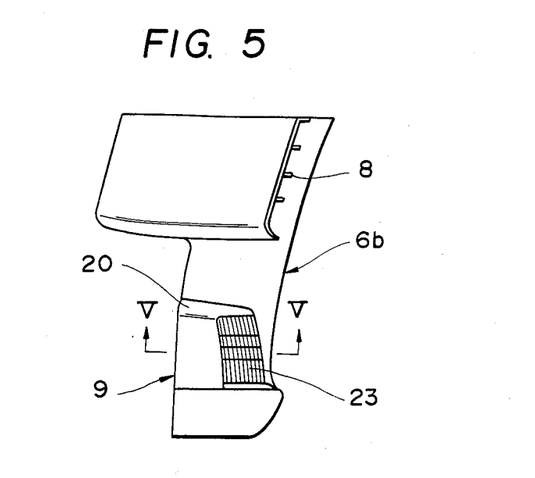
FIG. 5 is a side elevational view of the underfairing structure shown in FIG. 4.

On the other hand, both right-hand and left-hand lower portions 6b, 6b' of the fairing cover 6 (hereinafter referred to as "the under fairing cover") are also mounted detachably on the main frame structure 2 of the motorcycle 1, depending bifurcatedly in continuation from the upper fairing cover 6a and surrounding the main frame structure from the front area of the main frame 2 toward lower portions thereof on either lateral side thereof, respectively. In the upper and lower lateral sides of the right-hand under fairing cover 6b, there are seen provided integrally a ventilator opening 8 adapted to intake and guide air from the heading of the motorcycle and a housing 20 for a supplementary light device 9 according to the invention, respectively. As best shown in FIG. 3, it is designed that the upper surface level of the housing 20 of the supplementary light device 9 is a little lower than that of the head 3a of the engine 3 projecting horizontally outwardly from the main frame structure and that the supplementary light device 9 is disposed ahead of the engine head 3a with the lateral surfaces of the housing 20 located slightly laterally inwardly of the engine head 3a, having a continuous smooth stream line profile for a reduced air resistance starting from the area of a light-projecting lens 23 mounted in the front head towards a rear end portion thereof. With this configuration, a smooth stream line is presented by the outer marginal edges of the head 3a of the engine 3 projecting horizontally laterally outward from the main frame and of the supplementary light device 9, thus having turbulent flows of air as generated at and near the head 3a of the engine 3 rectified and smoothed accordingly when the motorcycle is running, and thus having the lateral surfaces of the housing 20 covered and protected sufficiently by way of the head 3a of the engine 3.

Figure 6:
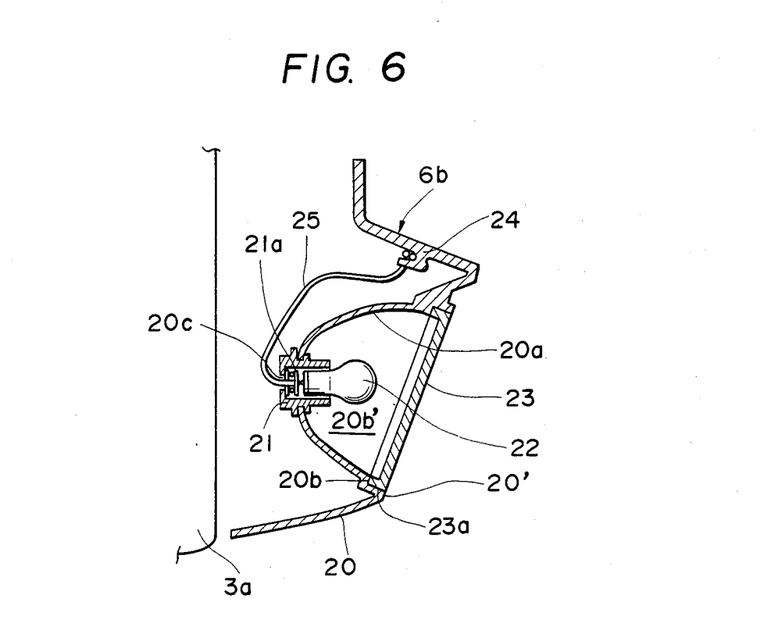
FIG. 6 is a fragmentary cross-sectional view taken along the plane V—V shown by an arrow in FIG. 5.
Figure 7:
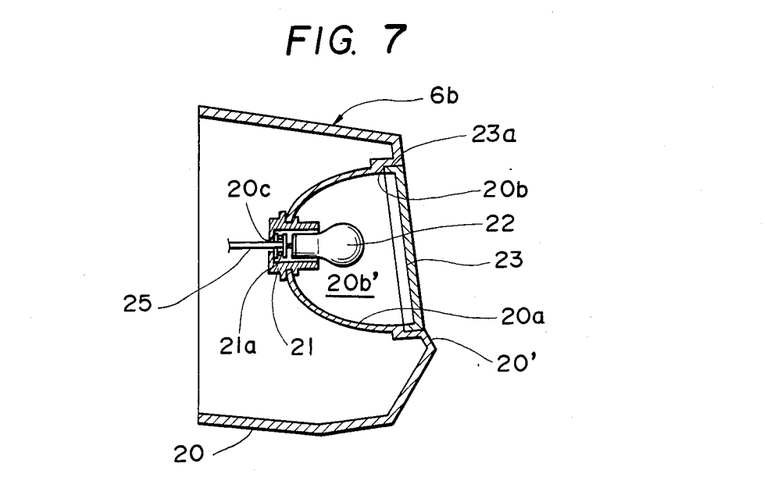
FIG. 7 is a similar cross-sectional view to FIG. 5, taken along the plane V—V shown by an arrow in FIG. 4.

As seen in FIGS. 6 and 7, in the interior of the housing 20 for the supplementary light device 9, there is also a reflector 20a formed by an internal wall integrally with the housing 20, which cooperates with the housing 20 to define a generally semicircular recess 20b' opening in an outer wall surface 20' of the housing. The reflector 20a has an opening edge portion 20b opened with a rim stepped in cross section, and has an opening 20c formed in the bottom center of the reflector 20a. A socket assembly 21, which is formed of deformable rubber, is seen provided detachably due to its deformation for replacement in the central opening 20c of the reflector 20a, and having a light bulb 22 installed in position on the socket assembly 21. The lens 23 is force fitted detachably at the outer peripheral edge face thereof into the opening edge portion 20b of the reflector 20. The opening edge portion 20b is so designed that the lens 23 has its light-projecting surface directed forwardly laterally outwardly of the motorcycle, and preferably, slightly upwardly.

Now, referring more specifically to the electrical power connection for the supplementary light device 9 according to this illustrated construction, there is provided a power terminal 21a of a socket assembly 21, which is connected by way of a power wiring or electric wire 25 extending upwardly through a harness guide 24 holding same, to be connected to a central connector 10, shown schematcally with a broken line in FIG. 1, the central connector 10 being connected in turn to a power battery through a shifting switch or the like, not shown. There is also provided the left-hand under fairing cover 6b' in the like manner with the right-hand under fairing cover 6b as noted hereinbefore, yet in the left side of the main frame structure, with a left-hand supplementary light device 9' being disposed in a mirror-image relationship with respect to the right-hand supplementary light device 9. No further description will be made for the avoidance of verbosity.

Figure 9:
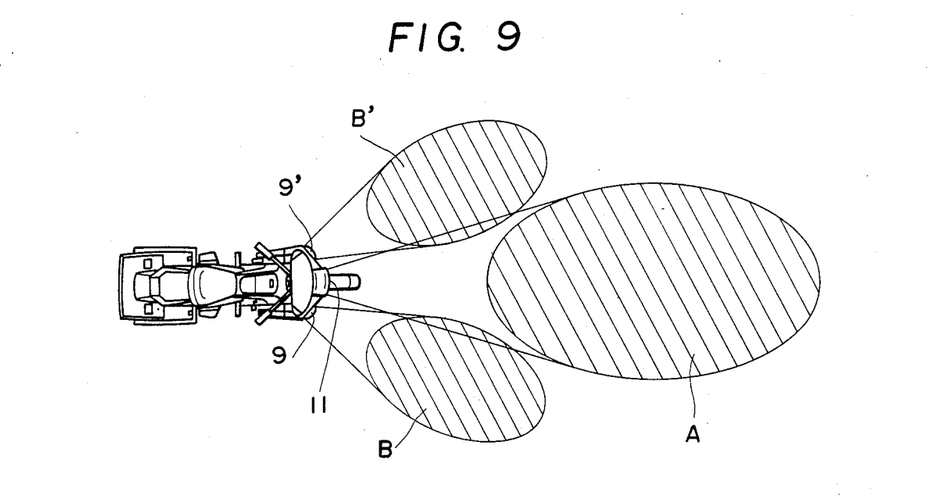
FIG. 9 is a schematic view showing the general ranges of lighting directed from the motorcycle mounted with a supplemetary light device according to the invention.

It is designed that the headlight 11 and the right-hand and left-hand supplementary light devices 9, 9' according to the invention can share the directivity or range of lighting of the motorcycle 1 as typically shown in FIG. 9. More specifically, the headlight 11 is designed to direct upon an area of ellipse A as shown by slant lines in front of the motorcycle, while the right-hand and left-hand supplementary light devices 9, 9' are designed to direct upon right and left areas of ellipse B, B' shown by slant lines in the nearer or shorter right and left sides than the area A of the headlight 11, respectively.

Figure 8:
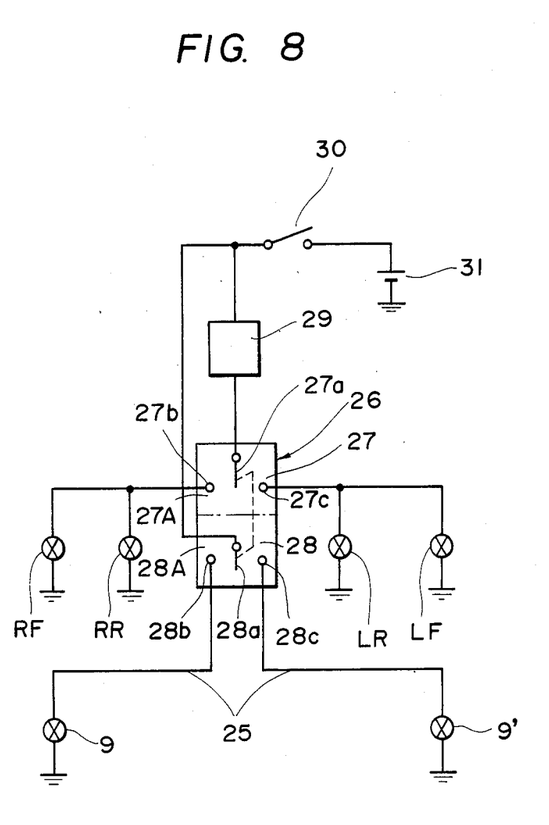
FIG. 8 is a circuit diagram showing a switch system for the supplementary light device.
Figure 10:
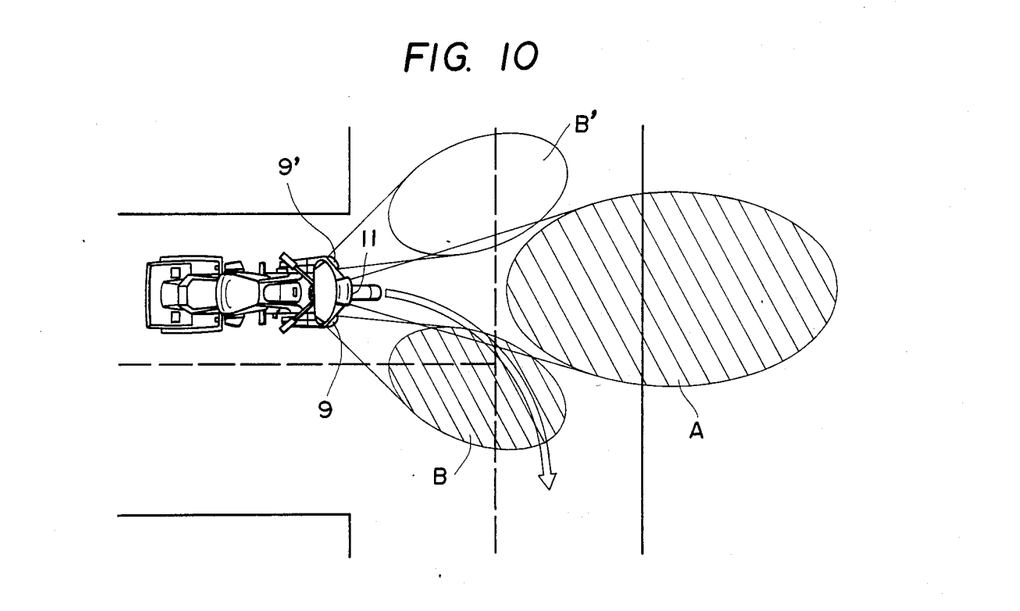
FIG. 10 is a similar view showing the specific ranges of lighting directed from a headlight and a right-hand supplementary light device of the invention, when the motorcycle is approching a T-junciton.

As more typically shown in FIG. 10 which shows an exemplary case that when the motorcycle is approaching a T-junction and the driver wishes to turn to the right, for instance, the right-hand supplementary light device 9 is turned on together with the headlight 11 so that the former may direct upon the area B, while directing a beam of light upon the area A by the latter, respectively. For turning on either of the right-hand and left-hand supplementary light devices 9, 9', it may be constructed that the light devices 9, 9' are shifted to be turned on by having these light devices interlocked in operation with each of corresponding direction indicators or winker lamps of the motorcycle. More specifically, as shown in FIG. 8, the supplementary light devices 9, 9' may be connected to a winker switch 26 arranged within a handle switch assembly mounted on a steering handle 12 of the motorcycle. The winker switch 26 comprises a first contact section 27 having fixed contacts 27b, 27c connected, respectively, to right-hand and left-hand winker lamps RF, RR; LR, LF on the front and rear sides, and a second contact section 28 having fixed contacts connected, respectively, to the right-hand and left-hand supplementary light devices 9, 9'. The first and second contact sections 27, 28 have their movable contacts 27a, 28a interlocked for synchronized movement to selectively assume right and left lighting positions and an intermediate or neutral position. The movable contact 27a of the first contact section 27 is connected to a power battery 31 by way of a winker relay 29 and a key switch 30, and the movable contact 28a of the second contact section 28 to the batter 31 by way of the key switch 30 alone, respectively. When the driver shifts the movable contact 27a of the first contact section 27 to the right or left fixed contact 27b or 27c, with the key switch 30 closed, the movable contact 28a of the second contact section 28 is automatically shifted to the right or left fixed contact 28b or 28c so that the right-hand or left-hand winker lamps RF, RR or LF, LR are lit intermittently by the action of the winker relay 29, and at the same time the right-hand or left-hand supplementary light device 29 or 29' is lit continuously. This specific example may ensure such an advantageous effect that either of the right-hand and left-hand supplementary light devices is automatically shifted to be turned on in synchronism with turning-on of either of the right-hand and left-hand direction indicators on a corresponding side.

Figure 11:
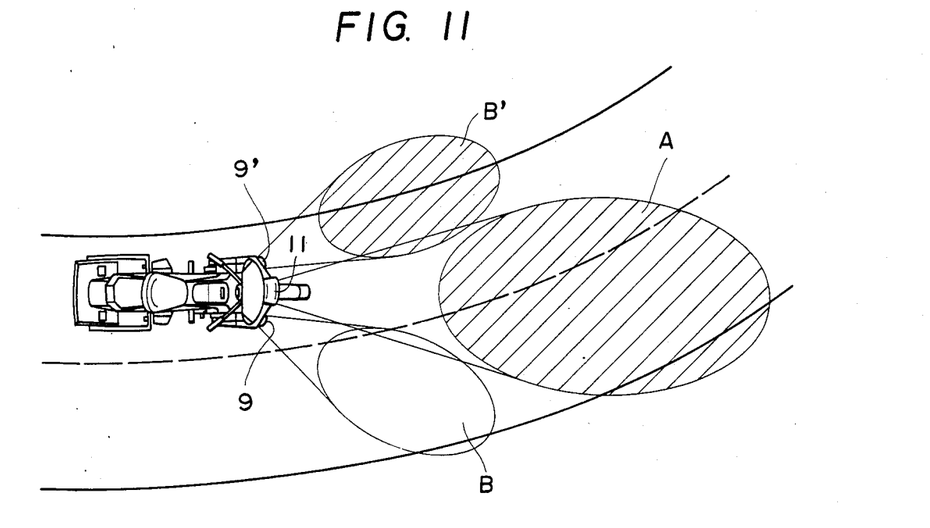
FIG. 11 is a similar view showing the specific ranges of lighting as directed from a headlight and a left-hand supplementary light device of the invention, when the motorcycle is running along a left-hand curve.

According to another example, it may be designed that the supplementary light devices 9, 9' are designed to be selectively shifted to be turned on upon the driver's manual operation of a suitable independent shifting switch provided exclusively for the supplementary light devices 9, 9', which may be installed upon the steering handle 12 or the like, in place of the interlocking arrangement with the direction indicators. For example, as indicated by the one-dot chain line in FIG. 8, the second contact section 28 may be provided separately from the first contact section 27 so as not to be shifted in synchronism with the latter but to be operated independently thereof. If required, the same section 28 may be arranged within a discrete housing 28A separated from the housing 27A for the first contact section 27, to constitute an exclusive switch for the supplementary light devices 9, 9'. This specific example may allow a driver of the motorcycle to selectively turn on either of the right-hand and left-hand supplementary light devices 9, 9' at his own choice; for instance, when the motorcycle is running along a left hand curve as shown in FIG. 11, the driver may have the left-hand supplementary light device 9 turned on independently to direct a light beam upon the left-hand curb line on the left-hand curved way as shown by an area B' together with an area A which is directed upon by the headlight 11 either at any moment or at any running point where the motorcycle driver may wish to turn on either of these supplementary light devices 9, 9'.

Figure 12:
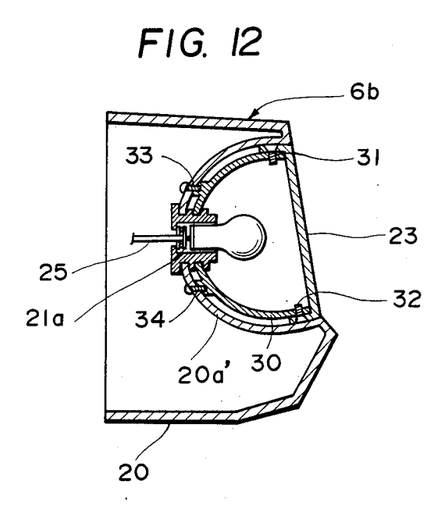
FIG. 12 is a fragmentary cross-sectional view showing another embodiment of the supplementary light device of the invention.

FIG. 12 shows by way of another embodiment of the invention the construction of the supplementary light device, wherein a reflector 30 and a housing 20 are fabricated in separate bodies or pieces and arranged in such a manner that the reflector 30 is laid over an internal wall 20a' integrally with the housing 20, similar to the internal 20a of the preceding embodiment, and fixed securely to the latter by means of screws 33 and 34, and that a lens 23 is undetachably fixed securely in position to the opening edge of the reflector 30 by means of screws 31 and 32. As all other parts are constructed identically with those as shown in FIGS. 6 and 7, any further description will be omitted for the avoidance of verbosity.

While preferred embodiments have been described, variations thereto will occur to those skilled in the art within the scope of the present inventive concepts which are delineated by the following claims.

What is claimed is:

1. A supplementary light device for use with a motorcycle of the type having a main frame structure, a fairing covering at least front and front lower areas of the main frame structure and haing a front face and a bifurcated and depending part extending downwardly on either side of the main frame structure, and a headlight provided at said front face of said fairing, said fairing having a ventilator opening in said bifurcated and depending part thereof and located at a lower level than said headlight, said supplementary light device comprising means adapted to incorporate said supplementary light device integrally in said bifurcated and depending part of said fairing at a location lower than said ventilator opening.

2. A supplementary light device as claimed in claim 1, wherein said incorporating means comprises a housing formed integrally with said bifurcated and depending part of said fairing and having an internal space defined therein, and fitting means for fitting said supplementary light device in said internal space.

3. A supplementary light device as claimed in claim 2, including a reflector, and wherein said housing has an internal wall defining said internal space, said reflector being formed by said internal wall.

4. A supplementary light device as claimed in claim 2, including a reflector, and wherein said reflector is formed in a separate body from said housing.

5. A supplementary light device as claimed in claim 1, wherein said fairing has an inner wall, said supplementary light device including an electric wiring, and guide means formed integrally with said inner wall of said fairing for holding and guiding said electric wiring.

6. A supplementary light device as claimed in claim 1, including a light-projecting lens, and wherein said lens has a light-projecting surface thereof directed forwardly laterally outwardly of the motorcycle.

7. A supplementary light device as claimed in claim 6, wherein said lens has a light-projecting surface thereof directed forwardly laterally outwardly and slightly upwardly of the motorcycle.

8. A supplementary light device as claimed in claim 1, wherein said motorcycle has a horizontally opposed cylinder engine installed therein, said supplementary light device being arranged ahead of said engine and adapted to present a smooth stream line profile in cooperation with said engine.

9. A supplementary light device as claimed in claim 1, wherein said motorcycle including direction indicators, said supplementary light device including switch means for turning on or off said supplementary light device in synchrnoism with turning-on or off of said direction indicators.

10. A supplementary light device as claimed in claim 1, including exclusive switch means for turning on or off said supplementary light device.

* * * * *